(No Model.)　　　　　　　　　　　　　　　　　　　　5 Sheets—Sheet 1.
A. H. W. DROSTE.
GRAIN WEIGHING AND REGISTERING MACHINE.
No. 408,467.　　　　　　　　　　　　　　　Patented Aug. 6, 1889.
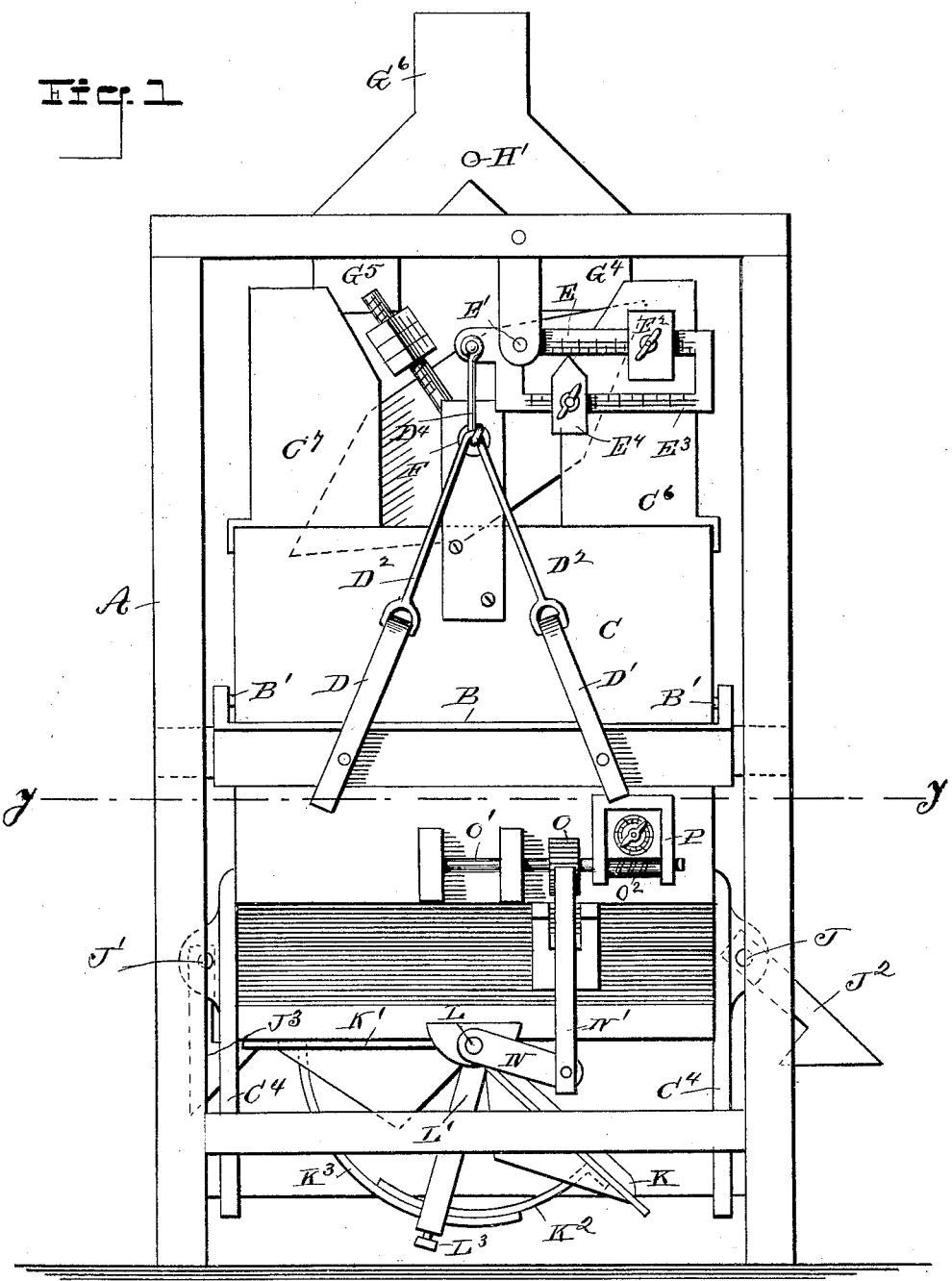

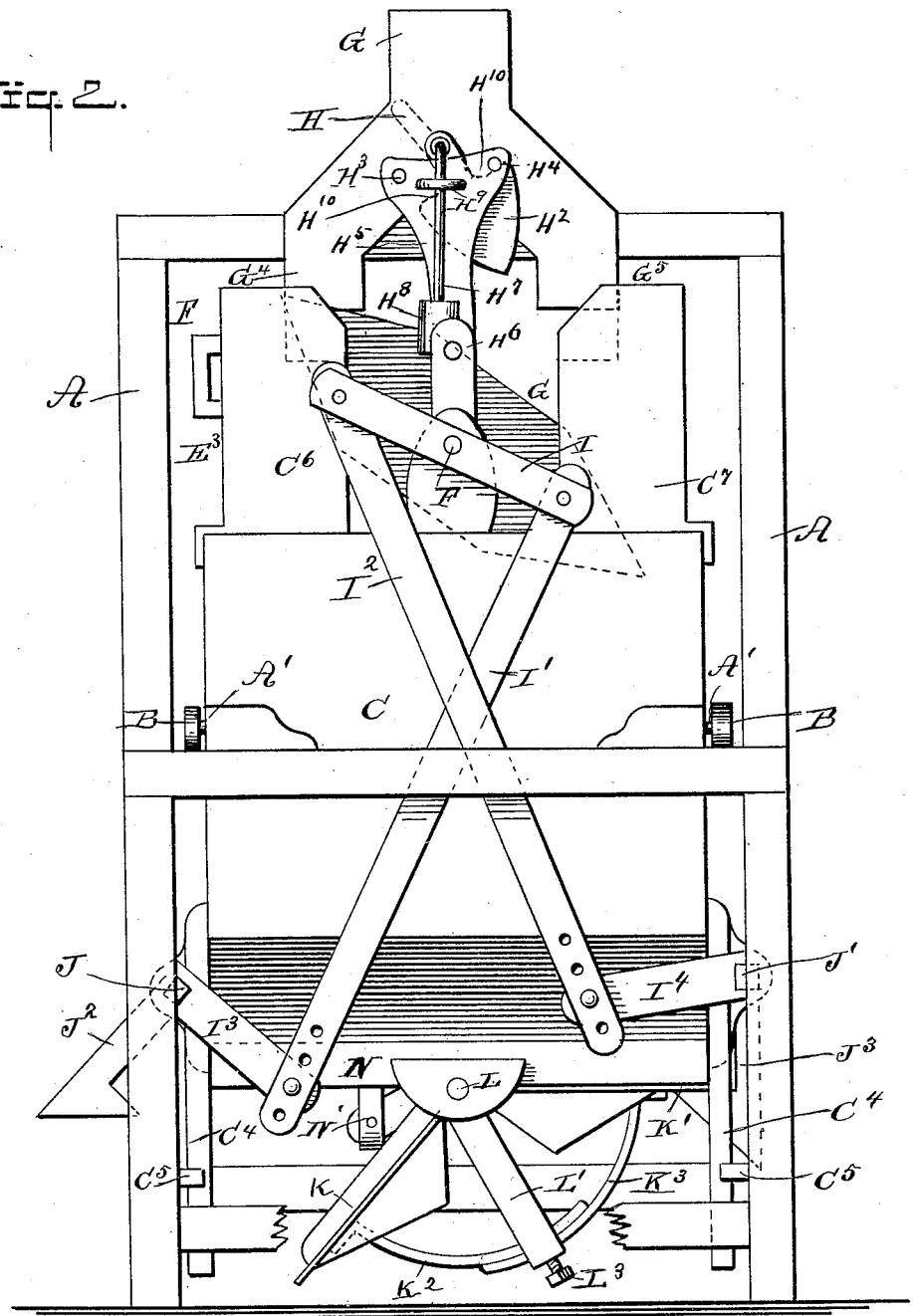

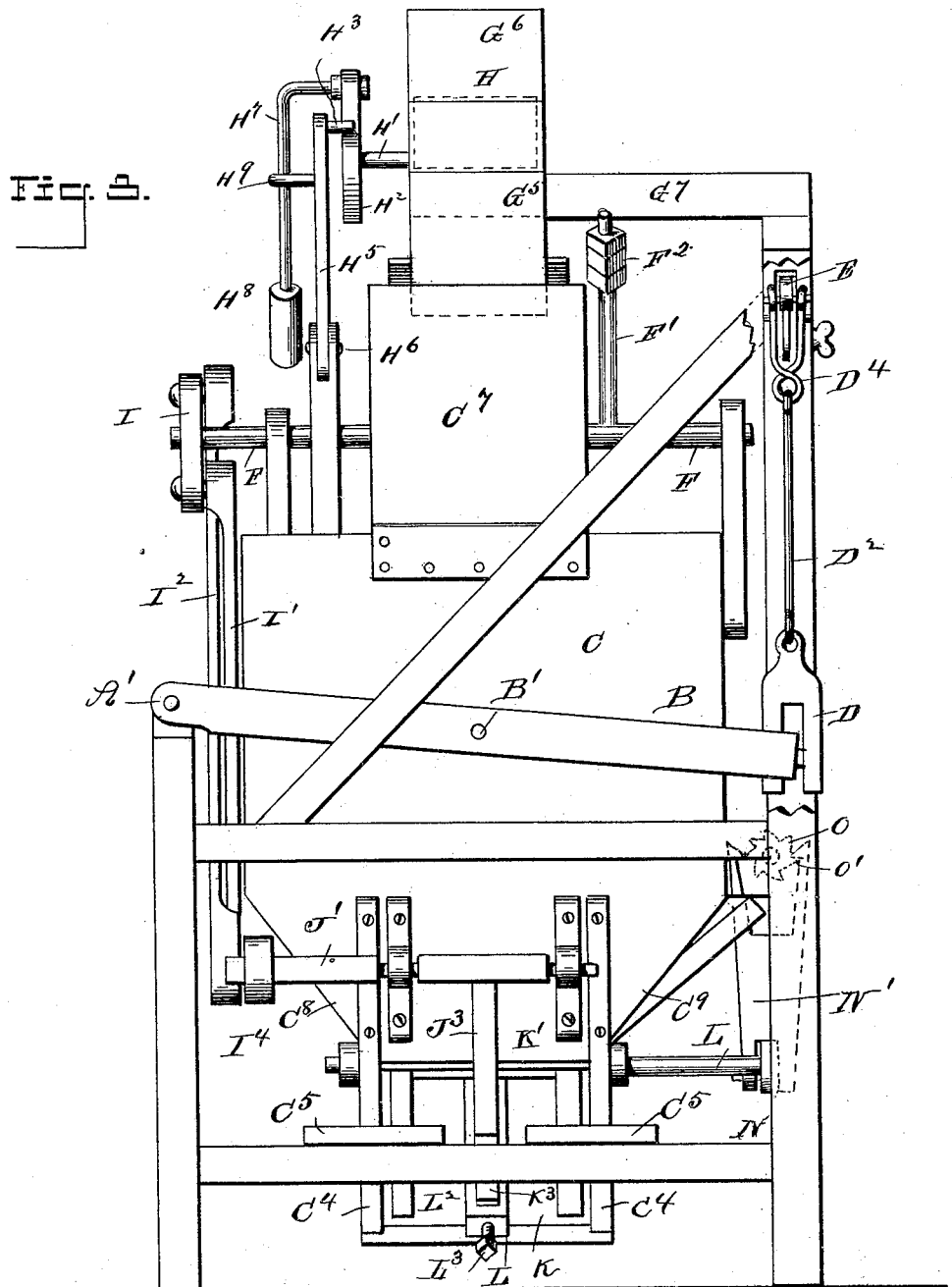

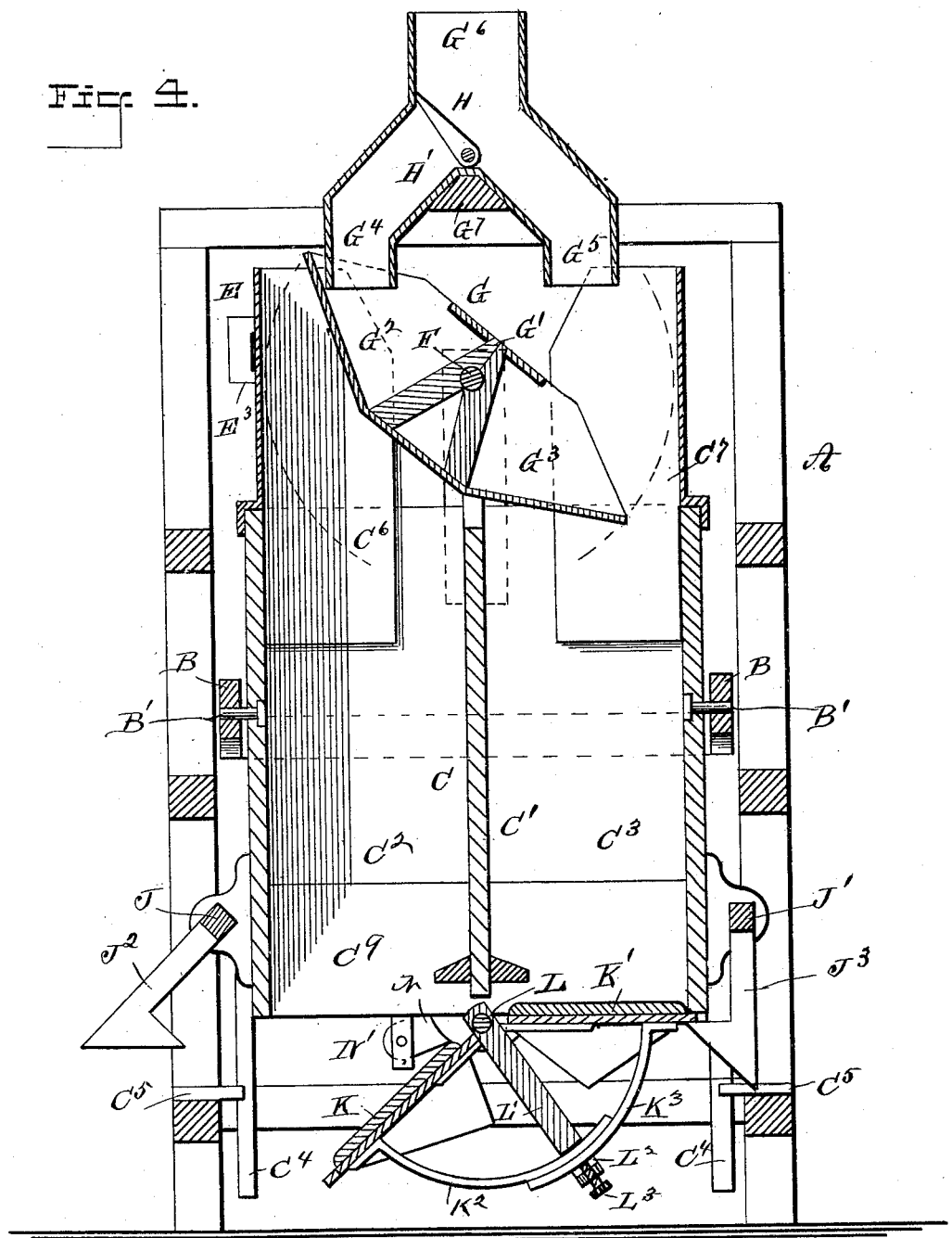

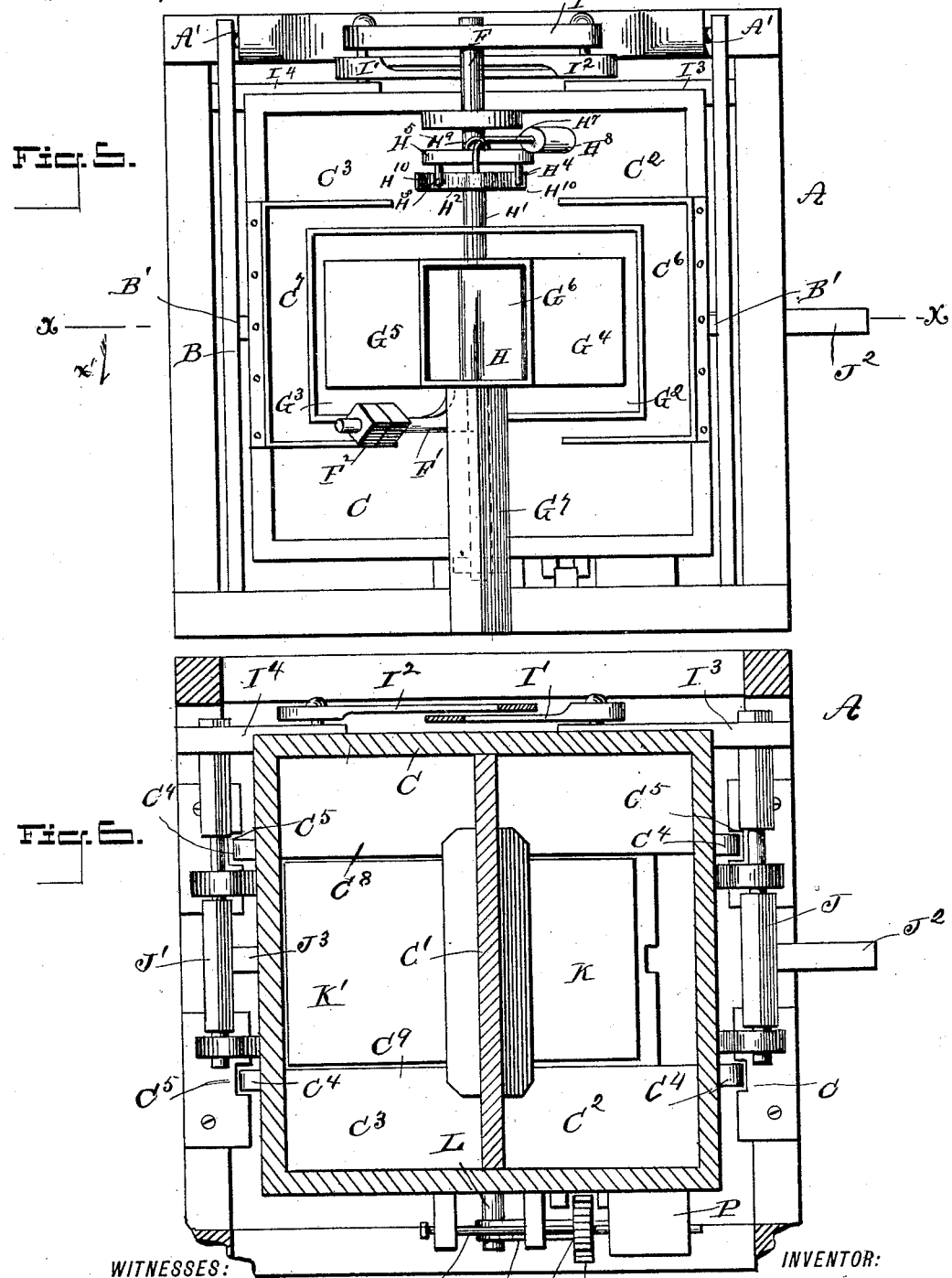

UNITED STATES PATENT OFFICE.

AUGUST H. W. DROSTE, OF ST. CHARLES, MISSOURI.

GRAIN WEIGHING AND REGISTERING MACHINE.

SPECIFICATION forming part of Letters Patent No. 408,467, dated August 6, 1889.

Application filed May 3, 1889. Serial No. 309,418. (No model.)

*To all whom it may concern:*

Be it known that I, AUGUST H. W. DROSTE, of St. Charles, in the county of St. Charles and State of Missouri, have invented a new and Improved Grain Weighing and Registering Machine, of which the following is a full, clear, and exact description.

The object of the invention is to provide a new and improved grain weighing and registering machine which is simple and durable in construction, very effective and automatic in operation, and is adapted to be easily and conveniently attached to a thrashing-machine.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a front elevation of the improvement. Fig. 2 is a rear elevation of the same with parts broken out. Fig. 3 is an end elevation of the improvement. Fig. 4 is a sectional side elevation of the same on the line $x\ x$ of Fig. 5, looking in the direction of the arrow $x'$. Fig. 5 is a plan view of the improvement, and Fig. 6 is a sectional plan view of the same on the line $y\ y$ of Fig. 1.

The improved grain weighing and registering machine is provided with a suitably-constructed frame A, on one side of which, at A', (see Figs. 3 and 5,) are fulcrumed the ends of the U-shaped bar B, supporting the grain-weighing receptacle C by means of pins B', extending from the sides of the receptacle into the U-shaped bar B, near the middle of the same, as is plainly shown in the drawings.

The grain-receptacle C is provided with a transverse partition C', dividing the receptacle into two compartments $C^2$ and $C^3$. From the lower end of the grain-receptacle C, on the outside, extend the vertical rods $C^4$, passing through suitable guideways $C^5$, secured to the frame A, and serving to guide the grain-receptacle C in its up-and-down motion.

The middle part of the U-shaped bar B is pivotally connected with the links D and D', connected at their upper ends with the ends of a V-shaped rod $D^2$, (see Figs. 1 and 3,) which is connected at its apex by a link $D^4$ with the scale-beam E, fulcrumed at E' near the top of the main frame A. The scale-beam E is provided with the usual poise $E^2$, and is also provided with an additional scale-beam $E^3$, on which is held to slide the adjustable poise $E^4$. The poise $E^2$ is adapted to be set to the amount which it is desired to weigh and register at one time, while the poise $E^4$ serves to counterbalance the weight of the grain-receptacle C and the parts supported by it.

On top of the grain-receptacle C is mounted to turn in suitable bearings a transversely-extending shaft F, held centrally above the partition C' of the receptacle C. On this shaft F is secured the grain-bucket G, having a transverse partition G', dividing the bucket into two compartments $G^2$ and $G^3$, open at the top and provided with slightly-inclined bottoms. Into the compartments $G^2$ and $G^3$ discharge the branch spouts $G^4$ and $G^5$, respectively, extending from the receiving-spout $G^6$, adapted to be connected by a flexible hose or other means with the grain-delivery spout of the thrashing-machine. The receiving-spout $G^6$ is rigidly supported by suitable beams $G^7$ or other means from the main frame A.

At the juncture of the branch spouts $G^4$ and $G^5$ with the spout $G^6$ is held a gate H, adapted to connect the spout $G^6$ alternately with the spouts $G^4$ and $G^5$. The gate H is secured on a shaft H', extending transversely and mounted to turn in suitable bearings in the sides of the spout $G^6$. On one outer end of the shaft H' (see Figs. 2 and 3) is secured an arrow-head $H^2$, extending between the pins $H^3$ and $H^4$, secured on an arm $H^5$, pivoted at $H^6$ to a bracket secured on the grain-receptacle C, said pivot $H^6$ being directly above the shaft F. On the arrow-head $H^2$ is hung a rod $H^7$, carrying at its lower end a weight $H^8$, and passing through a staple $H^9$, secured on the arm $H^5$, so as to hold the said arrow-head $H^2$ in place until the grain-receiver G is shifted. One of the pins $H^3$ or $H^4$ is always engaged by one of the notches $H^{10}$ of the arrow-head $H^2$, while the other one rests above the edge of the arrow-head, as shown in Fig. 2.

On the shaft F is secured an arm F', carrying a number of removable weights $F^2$, serving to counterbalance the grain-bucket G. On one outer end of the shaft F, supporting the grain-bucket G, is secured an arm I, extending an equal distance on each side of the shaft F. The outer ends of the arm I are pivotally connected by the links I' and I² with the crank-arms I³ and I⁴, respectively, secured on the ends of the shafts J and J', respectively, extending transversely and mounted to turn in suitable bearings secured to the lower ends of the grain-receptacle C.

In the middles of the shafts J and J' are secured the hooks J² and J³, respectively, extending at or nearly at right angles to the crank-arms I³ and I⁴, respectively. The hook ends of the hooks J² and J³ are adapted to engage the under sides of the bottoms K and K', respectively, adapted to open and close the lower ends of the compartments C² and C³ of the grain-receptacle C. The lower ends of the compartments C² and C³ are preferably made hopper-like by placing the sides C⁸ and C⁹ of the said lower ends of the receptacle in an inclined position, as is plainly illustrated in the drawings.

The bottoms K and K' extend at an obtuse angle to each other and are mounted to turn on a shaft L, extending transversely and mounted in suitable bearings secured to the under side of the receptacle C in the middle of the same. On the shaft L is secured an arm L', which stands midway between the bottoms K K', and is provided near its outer end with an opening L², into which pass freely the ends of the segmental arms K² and K³, respectively, secured to the under sides of the bottoms K and K', respectively. The segmental arms K² and K³ can be secured in place on the said arm L' by a set-screw L³ screwing in the end of the said arm and against the segmental arms K² and K³, respectively, as shown in Fig. 4. By this means the operator is enabled to adjust the bottoms K and K' to any desired angle in relation to each other, so that the said bottoms open and close the compartments C² and C³ sooner or later, as desired.

On one outer end of the shaft L is secured a crank-arm N, pivotally connected with a pawl N', extending upward and adapted to engage a ratchet-wheel O, secured on a longitudinally-extending shaft O', mounted to turn in suitable bearings on the outside of one of the sides of the grain-receptacle C. On the shaft O' is secured a worm O², meshing with a worm-wheel belonging to the registering device P, of any approved construction. When the shaft L oscillates, the crank-arm N moves up and down, so that a rotary motion is imparted to the ratchet-wheel O and its shaft O', whereby the registering device P is operated to indicate the number of oscillations made by the crank-arm N, thus indicating the number of times the bottoms K and K' have been opened and closed, as hereinafter more fully described.

In the upper ends of the grain-receptacle C are secured the vertical extension-chutes C⁶ and C⁷, opening into the compartments C² and C³ and inclosing the ends of the bucket G, so that when the latter is oscillated it discharges at its ends onto the chutes C⁶ and C⁷, respectively, which chutes guide the grain to the compartments C² and C³.

The operation is as follows: When the machine is to be used, the inlet-spout G⁶ is connected by a flexible hose or tube with the delivery-spout of the thrashing-machine, the poise E¹ is set to counterbalance the grain-receptacle C and the parts supported on the same, and the poise E² is set to the desired amount of grain to be weighed in one of the compartments C² or C³ at a time. When the grain-bucket G is in the position shown in Fig. 4, the grain entering the spout G⁶ passes into the branch spout G⁵, and from the latter over the bottom of the compartment G³ into the compartment C³ of the receptacle C. When sufficient grain has accumulated in the latter to overbalance the poise E² on the scale-beam E, then the receptacle C moves downward with the U-shaped bar B, connected with the said scale-beam E, as described. The downward motion of the receptacle C causes the pin H⁴ to act on the arrow-head H², whereby the latter is turned, and the gate H is shifted so as to connect the spout G⁶ with the spout G⁴. The grain from the thrashing-machine now passes into the compartment G² of the bucket G, and when sufficient grain has accumulated the bucket will tip over—that is, the compartment G² swings downward, while the compartment G³ swings upward. This swinging motion of the bucket G causes the shaft F to turn, whereby the bottom K' is unlocked by the hook J³ swinging outward by being connected by the arm I⁴ and link I² with the lever I on said shaft F. The grain in the compartment C³ now runs out into a suitable receptacle, such as a grain bin, bag, &c. The door K' opens by the weight of the grain on top of it as soon as the hook J³ swings outward, and this motion of the door K' causes the closing of the door K, as the latter is connected with the door K' by the segmental arms K² and K³ and the arm L'. The compartment C² is closed on the bottom before the grain-bucket compartment G² in its downward motion discharges into the said compartment C². In the meanwhile the compartment C³ runs empty, and then the poise E² returns the receptacle to its former position. The grain runs from the spouts G⁶ and G⁴ over the inclined bottom of the compartment G² of the bucket G into the compartment C² of the receptacle C until the scale-beam is again overbalanced. The above-described operation is then repeated. When the receptacle moves upward, the respective pin H³ or H⁴ drops over into the corresponding notch H¹⁰ in the arrow-head H², as the arm H⁵, carrying the said pins, swings by the action of the weighted rod H⁷ until the latter is in a vertical position. When the grain-receptacle C again moves downward, the pin H³ acts on the notch H¹⁰ of the arrow-head, so that the latter is shifted and the shaft H' turned, whereby the gate H swings to its former position, as shown in Fig. 4. It is to be understood that the weighted rod H⁷ swings into a vertical position to move the respective pin H³ or H⁴ into the notch H¹⁰ when the grain-receptacle C moves upward. The alternate opening and closing of the bottoms K and K' operates the register P, as before described, so that such amount of grain accumulated in the compartment C² or C³ is registered on the dial of the said registering device P.

Having thus fully described my invention, I claim as new and desire to secure by Letters Patent—

1. In a grain registering and weighing machine, the combination, with a grain-receptacle mounted to slide vertically and provided with a vertical central partition forming two compartments and a tilting grain-bucket discharging alternately into said compartments and mounted in bearings on the said receptacle, of a U-shaped pivoted arm pivotally connected with the said grain-receptacle and a weighing-beam connected with the said U-shaped arm, substantially as shown and described.

2. In a grain registering and weighing machine, the combination, with a grain-receptacle mounted to slide vertically and provided with two compartments, of a U-shaped pivoted arm pivotally connected with the said grain-receptacle, a weighing-beam connected with the said U-shaped arm, a grain-bucket mounted to turn, two fixed spouts discharging into the two ends of the said bucket, and a fixed inlet-spout opening into the said two spouts, substantially as shown and described.

3. In a grain registering and weighing machine, the combination, with a grain-receptacle mounted to slide vertically and provided with two compartments, of a U-shaped pivoted arm pivotally connected with the said grain-receptacle, a weighing-beam connected with the said U-shaped arm, a grain-bucket mounted to turn, two fixed spouts discharging into the two ends of the said bucket, a fixed inlet-spout opening into the said two spouts, and a gate held at the upper ends of the said two fixed spouts to alternately connect the latter with the said inlet-spout, substantially as shown and described.

4. In a grain registering and weighing machine, the combination, with a grain-receptacle mounted to slide vertically and provided with two compartments, of a U-shaped pivoted arm pivotally connected with the said grain-receptacle, a weighing-beam connected with the said U-shaped arm, a grain-bucket mounted to turn, two fixed spouts discharging into the two ends of the said bucket, a fixed inlet-spout opening into the said two spouts, a gate held at the upper ends of the said two fixed spouts to alternately connect the latter with the said inlet-spout, and means, substantially as described, for operating the said gate by the oscillating motion of the said grain-bucket, substantially as shown and described.

5. In a grain weighing and registering machine, the combination, with a grain-receptacle provided with two compartments, of a grain-bucket mounted to turn, two spouts discharging into the ends of the said bucket, a fixed inlet-spout supporting and opening into the said two spouts, and a gate for connecting the said inlet-spout alternately with the other spouts, substantially as shown and described.

6. In a grain weighing and registering machine, the combination, with a grain-receptacle provided with two compartments, of a grain-bucket mounted to turn, two spouts discharging into the ends of the said bucket, a fixed inlet-spout supporting and opening into the said two spouts, a gate for connecting the said inlet-spout alternately with the other spouts, and bottoms mounted to swing on the under side of the said grain-receptacle and adapted to alternately close the lower openings of the said compartments, substantially as shown and described.

7. In a grain weighing and registering machine, the combination, with a grain-receptacle provided with two compartments, of a grain-bucket mounted to turn, two spouts discharging into the ends of the said bucket, a fixed inlet-spout supporting and opening into the said two spouts, a gate for connecting the said inlet-spout alternately with the other spouts, bottoms mounted to swing on the under side of the said grain-receptacle, adapted to alternately close the lower openings of the said compartments, and means, substantially as described, for locking the said bottoms by the oscillation of the said grain-bucket, substantially as shown and described.

8. In a grain weighing and registering machine, the combination, with a grain-receptacle provided with two compartments, of a shaft extending transversely between the said compartments at their lower ends, bottoms pivotally connected to the said shaft and adapted to open and close the lower ends of the said compartments alternately, an arm secured on the said shaft and extending between the said two bottoms, and segmental arms extending from the said bottoms and adapted to be locked in place on the said arm, substantially as shown and described.

9. In a grain weighing and registering machine, the combination, with a grain-receptacle provided with two compartments, of a shaft extending transversely between the said compartments at their lower ends, bottoms pivotally connected to the said shaft and adapted to open and close the lower ends of the said compartments alternately, an arm secured on the said shaft and extending between the said two bottoms, segmental arms extending from the said bottoms and adapted to be locked in place on the said arm, a crank-arm secured to the said shaft, and a registering apparatus operated from the said crank-arm and serving to register the opening and closing of the said bottoms, substantially as shown and described.

10. In a grain weighing and registering machine, the combination, with a grain-receptacle mounted to swing up and down, of an oscillating grain-bucket discharging alternately into two compartments of the said receptacle, a gate controlling the inlet of grain to the said grain-bucket, an arrow-head held on the shaft of the said gate, an arm fulcrumed on the said grain-receptacle and provided with two pins engaging the said arrow-head, and a weighted rod pivoted on the said arrow-head and guided on the said arm, substantially as shown and described.

AUGUST H. W. DROSTE.

Witnesses:
LOUIS H. BREKER,
HENRY H. BRUNS.